Patented May 24, 1949

2,470,908

UNITED STATES PATENT OFFICE 2,470,908

PREPARATION OF GRANULAR POLYMERS OF VINYL HALIDES

Massimo Baer, Springfield, Mass., assignor to Monsanto Chemical Company, St. Louis, Mo., a corporation of Delaware No Drawing. Application December 10, 1947, Serial No. 790,931

13 Claims. (Cl. 260—78.5)

This invention relates to vinyl halide-containing polymeric products. More particularly, this invention relates to vinyl halide-containing polymeric products in a finely divided state.

In my co-pending patent application, Serial Number 691,412, filed August 17, 1946, there is disclosed and claimed a process for the polymerization of vinyl halide-containing materials in aqueous suspension, there being dissolved in the aqueous phase thereof an heteropolymer of vinyl acetate and maleic acid or anhydride. This process leads to granular products of high quality. However, considerable difficulty is encountered in obtaining the granular products with the degree of fineness sometimes desired.

It is an object of this invention to provide vinyl halide-containing polymeric products in the form of fine grains. A particular object of this invention is to provide a method for reducing the particle size of the granular product obtained by polymerizing vinyl halide-containing materials in the presence of an aqueous solution of an heteropolymer of vinyl acetate and maleic acid or anhydride.

These and other objects are accomplished according to this invention by polymerizing vinyl halide-containing materials in an aqueous suspension, the aqueous phase thereof having dissolved therein an heteropolymer of vinyl acetate and maleic acid or anhydride, in the presence of an alkyl phthalate in which the alkyl groups each contain 2–10 carbon atoms.

The following examples are illustrative of the present invention, but are not to be construed as limitative thereof. Where parts are mentioned, they are parts by weight.

In each example in the table, the procedure used is that given below.

200 parts of water are placed in a glass-lined autoclave and then the indicated amount of heteropolymer of vinyl acetate and maleic anhydride is added and dissolved in the water by heating and stirring the mixture. Thereafter, 0.2 part of lauroyl peroxide and the alkyl phthalate are introduced and the air in the autoclave is swept out with vinyl chloride gas. The autoclave is then sealed and 100 parts of vinyl chloride are introduced. The resulting mixture is heated and stirred at 50° C. for 20 hours. As a result of this treatment, substantially all of the vinyl chloride is polymerized, i. e., more than 95%. The polymer is recovered from the suspending medium by centrifuging the product. The recovered polymer is washed with water and dried.

The heteropolymer used in the examples is made by copolymerizing one gram molecular weight of vinyl acetate with one gram molecular weight of maleic anhydride in the presence of 60 cc. of benzene and 0.13 part of benzoyl peroxide at 50° C. for 72 hours. The product, after being freed from the benzene by drying at 60–70° C. is in the form of a fine powder.

Table

| Example | Heteropolymer, Parts | Alkyl Phthalate | Parts |
|---|---|---|---|
| I | 0.2 | Dibutyl phthalate | 1 |
| II | 0.2 | ___do___ | 8 |
| III | 0.2 | Dioctyl phthalate | 1 |
| IV | 0.2 | ___do___ | 8 |
| V | 0.2 | | |

Examination of the products of Examples I–V shows that the products of Examples I–IV have substantially reduced average particle sizes as compared with the product of Example V. Furthermore, the products of Examples II and IV have substantially smaller average particle sizes than the products of Examples I and III respectively.

The amount of particle size reducing agent may be substantially varied. Thus, as little as 0.5% based on the amount of monomeric material has a definite effect on the particle size of the polymeric product. Usually not more than 15% is desirable since larger amounts may impart undesirable properties to the product. Preferably, 2–5% of the alkyl phthalate are used based on the amount of monomer being polymerized.

In place of the alkyl phthalates used in the examples, other alkyl phthalates may be used in which the alkyl groups contain 2–10 carbon atoms such as diethyl phthalate, dipropyl phthalate, dipentyl phthalate, dinonyl phthalate, didecyl phthalate. The alkyl groups in the phthalates used in the process of the invention may comprise straight or branched chains and may be the same or different provided each contains 2–10 carbon atoms.

The heteropolymers of vinyl acetate and maleic acid or anhydride used in the process of the invention may be made by usual methods for polymerizing unsaturated materials, e. g., in solution, in mass, or in a liquid which is a solvent for the monomeric materials, but not for the heteropolymer. Illustrative examples are set forth in my co-pending patent application, Serial Number 691,412, filed August 17, 1946. A particularly preferred procedure is set forth in my co-pending application, Serial Number 790,221, filed December 6, 1947, whereby especially high molecular weight products are obtained by polymerization in the presence of a small amount of a material which is a solvent for the monomeric materials, but not for the heteropolymer.

Usually maleic anhydride is preferred over maleic acid as the copolymerizing material in view of the faster polmerization rates which result. Since on solution of the vinyl acetate-maleic anhydride heteropolymer in water, the anhydride groups hydrolyze to carboxyl groups, there is no disadvantage in using this heteropolymer.

In preparing the heteropolymers in the presence of a solvent for the monomers which is a non-solvent for the polymer, such liquids may be used as benzene, toluene, xylene, hexane, chlorobenzene, chlorotoluene, chloroxylene, dichloroethylene, trichloroethylene and the corresponding bromo or fluoro compounds.

The heteropolymer - containing suspending agents may be made by polymerizing mixtures of vinyl acetate and maleic acid or anhydride in varying molar ratios, e. g, from 1:9 to 9:1. Usually, it is preferred that the ratio of maleic acid or anhydride to vinyl acetate does not exceed 1:1 since the use of an excess of maleic acid or anhydride may be undesirable in some cases. However, it may be desirable that the ratio of vinyl acetate to anhydride exceed 1:1. For example, the ratio may be as high as 9:1, as pointed out above.

Heteropolymers of vinyl acetate and maleic acid or anhydride possess a substantial solubility in water without the use of compounds forming salts therewith. Usually the aqueous solutions thereof are clear. However, the products resulting from polymerizing mixtures of vinyl acetate and maleic acid or anhydride containing a substantial molar excess of vinyl acetate, i. e., more than 1.5–2.0 mols of vinyl acetate for every mol of maleic acid or anhydride, tend to form hazy aqueous solutions. While these heteropolymers may be used as suspending agents and are comprehended by the present invention, it is preferred to use the heteropolymers which form clear aqueous solutions without the addition of salt-forming materials since these heteropolymers are more effective as suspending agents.

In carrying out the process of the invention, the polymerizing temperature may be substantially varied, and the temperature employed is governed by the particular characteristics desired in the polymeric material and the nature of the material being polymerized. In the case of vinyl halides and many mixtures of vinyl halides and materials copolymerizable therewith, temperatures of 30–100° C. are usually employed. Usually only a small concentration of the dispersing agent of the invention is necessary. For example, 0.005–2.0% and, more particularly, 0.01–0.5% based on the amount of water used, is usually sufficient. However, larger amounts may be employed when desired, for example, up to the limit of solubility of the heteropolymer in the water. The optimum quantity of the dispersing agent depends upon a number of factors, for example, the ratio of water to monomer. Thus, as the water : monomer ratio is increased, the ratio of suspending agent to water may be decreased. Another factor affecting the amount of the suspending agent required is the rate at which the particular charge polymerizes. In general, the faster the rate of polymerization, the smaller is the amount of suspending agent required. Other factors affecting the optimum amount of suspending agent include the degree of fineness desired in the polymeric product and the speed of agitation.

In carrying out the polymerization process of the invention, it is generally preferred that a water : monomer weight ratio of at least 1:1 be used, but generally, the water : monomer ratio does not exceed 9:1. The dispersing agent concentrations mentioned above may be used within these limits of water : monomer ratios.

As indicated above, it is desirable in carrying out the polymerization process of the invention to substantially free the atmosphere above the polymerizing mixture from oxygen by replacing the air prior to polymerization with carbon dioxide, vinyl chloride, nitrogen or other inert gas. This may be done by sweeping out the air with a stream of inert gas or by subjecting the polymerization charge to partial vacuum, thereby sweeping out the air with vapors from the charge.

The process of this invention is useful in the polmerization of vinyl halides, e. g., vinyl chloride, vinyl bromide, etc., and the copolymerization of viny halides with such copolymerizable water-insoluble unsaturated compounds as vinyl esters of carboxylic acids, for example, vinyl acetate, vinyl propionate, vinyl butyrate, vinyl benzoate; esters of unsaturated acids, for example, methyl acrylate, ethyl acrylate, butyl acrylate, allyl acrylate and the corresponding esters of methacrylic acid; vinyl aromatic compounds, for example, styrene, ortho-chlorostyrene, para-chlorostyrene, 2,5-dichlorostyrene, 2,4-dichlorostyrene, para-ethyl styrene, divinyl benzene, vinyl naphthalene, alpha-methyl styrene; dienes, such as butadiene, chloroprene; amides, such as acrylic acid amide, acrylic acid anilide; nitriles, such as acrylic acid nitrile; esters of $\alpha,\beta$-unsaturated carboxylic acids, for example, the methyl, ethyl, propyl, butyl, amyl, hexyl, heptyl, octyl, allyl, methallyl and phenyl esters of maleic, crotonic, itaconic, fumaric acids and the like.

Preferably, in the case of copolymerization, a predominant portion, i. e., more than 50% by weight, of the mixture of monomers is a vinyl halide, especially vinyl chloride.

A particularly preferred embodiment of the invention comprises the polymerization of a mixture of vinyl chloride and an ester of an $\alpha,\beta$-unsaturated dicarboxylic acid such as diethyl maleate, in which 5–20 parts by weight of the ester are used for every 95–80 parts by weight of vinyl chloride. Among the preferred esters of $\alpha,\beta$-unsaturated dicarboxylic acids are the alkyl esters in which the alkyl group contains 2–8 carbon atoms.

In place of lauroyl peroxide used in the examples, other water-insoluble catalysts may be used such as benzoyl peroxide, ditertiary butyl peroxide, oleyl peroxide, toluyl peroxide and the like. Mixtures of two, three or more of these and other catalysts may be used when desired. In certain cases, the catalyst may be eliminated, for example, when rapid polymerization is obtained in the absence of catalyst. In certain cases, the action of light may be helpful in expediting the polymerization.

The above catalysts are also illustrative of catalysts which may be used in making the heteropolymer dispersing agent.

The foregoing description is given in illustration and not in limitation of the invention as set forth in the appended claims.

What is claimed is:

1. In a process wherein a polymerizable material containing a vinyl halide from the group consisting of vinyl chloride and vinyl bromide is polymerized while dispersed in an aqueous medium having dissolved therein as a dispersing agent a heteropolymer of vinyl acetate and a substance from the group consisting of maleic acid and maleic anhydride, the step which comprises incorporating in the aqueous medium prior to polymerization 0.5–15%, based on the polymerizable material, of an alkyl phthalate in which the alkyl groups each contain more than 1 but less than 11 carbon atoms, as a particle size reducing agent.

2. In a process wherein a polymerizable material containing a vinyl halide from the group consisting of vinyl chloride and vinyl bromide is polymerized while dispersed in an aqueous medium having dissolved therein as a dispersing agent 0.005–2.0% based on the amount of water of a heteropolymer of vinyl acetate and a substance from the group consisting of maleic acid and maleic anhydride, the step which comprises incorporating in the aqueous medium prior to polymerization 0.5–15%, based on the polymerizable material, of an alkyl phthalate in which the alkyl groups each contain more than 1 but less than 11 carbon atoms, as a particle size reducing agent.

3. A process as defined in claim 1 in which the polymerizable material is vinyl chloride.

4. A process as defined in claim 3 in which the alkyl phthalate is dibutyl phthalate.

5. A process as defined in claim 1 in which the aqueous dispersion contains a mixture of vinyl chloride and an unsaturated compound copolymerizable therewith.

6. A process as defined in claim 5 in which the copolymerizable compound is a vinyl ester of a lower aliphatic acid having 2–4 carbon atoms.

7. A process as defined in claim 6 in which the vinyl ester is vinyl acetate.

8. A process as defined in claim 5 in which the copolymerizable compound is an alkyl ester of an $\alpha,\beta$-unsaturated dicarboxylic acid in which the alkyl groups contain more than 1 but less than 9 carbon atoms.

9. A process as defined in claim 8 in which the copolymerizable compound is diethyl maleate.

10. A process as defined in claim 1 in which the alkyl phthalate is dibutyl phthalate.

11. A process as defined in claim 10 in which 2–5% dibutyl phthalate is used, based on the monomeric material.

12. A process as defined in claim 1 in which the alkyl phthalate is dioctyl phthalate.

13. A process as defined in claim 12 in which 2–5% dioctyl phthalate is used, based on the monomeric material.

MASSIMO BAER.

REFERENCES CITED

The following references are of record in the file of this patent:

UNITED STATES PATENTS

| Number | Name | Date |
|---|---|---|
| 2,322,309 | Morgan et al. | June 20, 1943 |